United States Patent [19]

Dieck et al.

[11] 4,092,278

[45] May 30, 1978

[54] MOLECULAR-WEIGHT MODIFICATION OF POLYPHOSPHAZENES

[75] Inventors: Ronald L. Dieck; Louis Goldfarb; Nancy D. Hann, all of Lancaster, Pa.

[73] Assignee: Armstrong Cork Company, Lancaster, Pa.

[21] Appl. No.: 694,978

[22] Filed: Jun. 11, 1976

[51] Int. Cl.² ................................................. C08J 9/10
[52] U.S. Cl. ................................. 260/2.5 R; 260/2 P; 260/30.4 N; 260/30.8 DS; 260/32.6 N; 260/33.6 R; 260/37 N; 260/47 P
[58] Field of Search ................... 260/2 P, 2.5 R, 47 P

[56] References Cited

U.S. PATENT DOCUMENTS

| 3,732,175 | 5/1973 | Allcock | 260/2 P |
|---|---|---|---|
| 3,856,712 | 12/1974 | Reynard | 260/2 P |

*Primary Examiner*—Morton Foelak
*Attorney, Agent, or Firm*—Richard J. Hammond

[57] ABSTRACT

A novel process has been developed for the molecular-weight modification of polyphosphazenes. Poly(aryloxyphosphazenes) are thermally treated in an inert atmosphere or vacuum at temperatures from 100° C. to 300° C. so as to yield materials having reduced molecular weights, improved processability, and enhanced thermal stability.

7 Claims, No Drawings

MOLECULAR-WEIGHT MODIFICATION OF POLYPHOSPHAZENES

BACKGROUND OF THE INVENTION

FIELD OF THE INVENTION

This invention relates to the preparation of soluble medium molecular weight phosphazene polymers. More particularly, it relates to the preparation of medium molecular weight poly(aryloxyphosphazene) homopolymers and copolymers by the thermally-induced stabilization of high molecular weight homologs.

The preparation of poly(aryloxyphosphazene) homopolymers and copolymers has been disclosed in U.S. Pat. No. 3,732,175, Allcock; U.S. Pat. No. 3,856,712, Renard et al; U.S. Pat. No. 3,856,713, Rose et al; and U.S. Pat. No. 3,883,451, Renard et al. Allcock discloses cross linking of phosphazene polymers by ligand exchange so as to create higher molecular weight cross-linked materials. The copolymers described in the first-mentioned Renard et al patent contain selected quantities of both aryloxy and alkoxy side chains on the phosphazene backbone, and the copolymers described in the latter-mentioned Renard et al patent are characterized by the presence of halogen-substituted aryl side chains on the phosphazene backbone. The copolymers disclosed in the above-mentioned Rose et al patent are characterized by the presence of only aryloxy and alkyl-substituted aryloxy side chains. Other related prior art may be found in U.S. Pat. Nos. 3,515,688; 3,700,629; 3,702,833; and 3,856,712.

It is generally recognized that the prior art phosphazene polymers disclosed above are low-temperature, elastomeric and film-forming thermoplastics. Depending on the nature of the substituent on the phosphorus-nitrogen backbone, impressive hydrolytic and chemical stabilities have been found to be associated with these polymers. However, the prior art has uniformly associated phosphazene polymers with extreme ease of thermally-induced depolymerization. The tendency for poly(alkoxy and aryloxyphosphazenes) to undergo such degradation, forming oligemers, has been demonstrated, as has such tendency in the poly(fluoroalkoxy and bisaryloxy) systems. See, for example, Allcock, H. R. et al, Macromolecules, 7,284 (1976).

Recently, other phosphazene polymers have been disclosed, such containing substituted aryloxy-substituents (preferably substituted in the para position) on the phosphorus atoms in a non-regular fashion, which are represented by the following formulas:

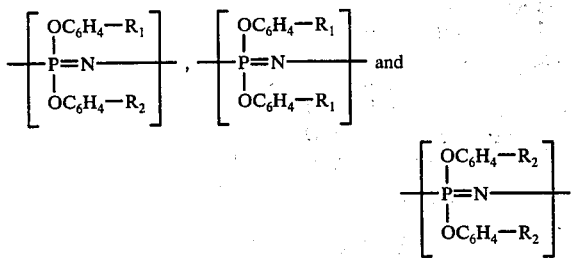

wherein $R_1$ and $R_2$ are the same or different and are hydrogen or $C_1-C_{10}$ linear or branched alkyl or $C_1-C_4$ linear or branched alkoxy substituted in any sterically permissible position on the phenoxy group. See U.S. patent application Ser. No. 661,862, filed Feb. 27, 1976. As is generally the case for polymeric organo phosphazenes, the above-disclosed polymers are castable and processable to a certain extent, such mainly being controlled by the solubility of these materials in the various solvents. However, polymerization techniques for the phosphazene polymers as a whole, and for the above alkoxy and aryloxy materials, result in uncontrollably high molecular weights, e.g. $M_w$ equals greater than $1 \times 10^6$.

In general, the high molecular weight polyphosphazenes are disadvantageously soluble in solvents and process with extreme difficulty. Film casting is, therefore, strictly limited to relatively thin films of polyphosphazene. Processing can only practically incorporate small amounts of material, since common plastic processing techniques, e.g. rubber mills, Banbury mixers, and the like, require extensive amounts of processing time in order to achieve uniform mixing. Furthermore, in either solvent or processing techniques, temperatures developed during the process must be closely controlled since uncontrollable crosslinking, depolymerization or oligemer formation may start at temperatures as low as 100° C.

There is, therefore, a need for phosphazene materials showing improved solubility in organic solvents, shortened mill processing times, and enhanced thermal stability at temperatures of greater than 100° C.

SUMMARY OF THE INVENTION

It is an object of the present invention to provide phosphazene polymers that are of improved thermal stability.

It is another object of this invention to provide poly(aryloxyphosphazene) homopolymers and copolymers that are of good solubility and easy processing.

It is a further object of this invention to provide poly(aryloxyphosphazene) homopolymers and copolymers that are of reduced molecular weight.

It is a further object of this invention to provide poly(aryloxyphosphazene) homopolymer and copolymer foams of improved thermal stability.

These and other objects of the present invention are obtained by thermally treating aryloxy-substituted phosphazenes of the following formulas:

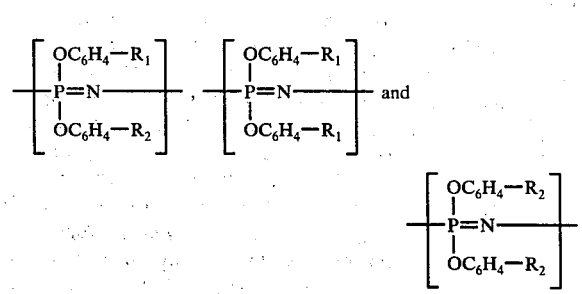

wherein $R_1$ and $R_2$ are the same or different and are hydrogen or $C_1-C_{10}$ linear or branched alkyl or $C_1-C_4$ linear or branched alkoxy substituted in any sterically permissible position on the phenoxy group.

DESCRIPTION OF THE PREFERRED EMBODIMENTS

The poly(aryloxyphosphazene) polymers that, when thermally treated in accordance with the present invention, are characterized by repeating units which contain substituted aryloxy-substituents (preferably substituted in the para position) on the phosphorus atoms in a non-regular fashion and which can be represented by the following formulas:

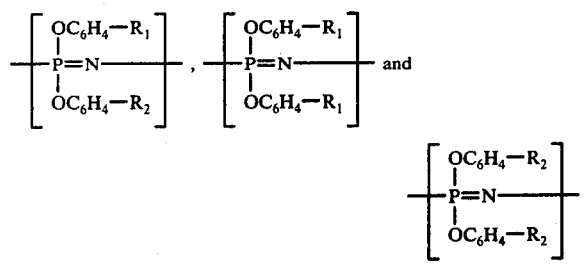

wherein $R_1$ and $R_2$ are the same or different and are hydrogen or $C_1$-$C_{10}$ linear or branched alkyl or $C_1$-$C_4$ linear or branched alkoxy substituted in any sterically permissible position on the phenoxy group. It is to be understood that while it is presently preferred that all $R_1$'s are the same as all $R_2$'s, $R_1$ can be mixed and $R_2$ can be mixed, such being mixtures of different alkyl radicals, or mixtures of different ortho, meta, and para isomers. Desirably, however, groups which sterically inhibit the reaction to produce the polymers should be avoided. Absent the foregoing, the selection of the various $R_1$'s and $R_2$'s will be apparent to anyone skilled in the art, based upon this disclosure and that of U.S. patent application Ser. No. 661,862. The polymers of this invention are sometimes referred to herein as copolymers. However, it should be noted that when $R_1$ and $R_2$ are the same, such gives rise to homopolymeric phosphazenes and such are included in the present invention. Furthermore, when $R_1$ and $R_2$ are different, the copolymers of the invention which contain the above three repeating units may be represented by the formula $[NP(OC_6H_4-R_1)_a(OC_6H_4-R_2)_b]_n$, wherein $n$ is from about 20 to about 2,000 or more and wherein $a$ and $b$ are greater than 0, and $a + b = 2$.

In the case of copolymers in accordance with the present invention, the ratio of $a:b$ affects the processability, smoke production, glass transition temperature and a number of other properties of such. These ratios also affect the copolymer's ability to be foamed and the properties, such as the rigidity, or the resulting foams. It is generally known that an increase in the mole percent of alkoxy $R_1$ or $R_2$ decreases the amount of smoke generated when the copolymers are subjected to an open flame. When the mole percent of alkyl $R_1$ or $R_2$ approaches 100%, the crystallinity of the copolymers increases and their ability to be foamed diminishes. These factors are also extant in the thermally treated copolymers in accordance with this invention. Accordingly, it is contemplated that the copolymers useful in forming the improved copolymers of this invention contain a mole ratio of $a:b$ of at least about 1:6 and up to about 6:1, and preferably between about 1:4 and 4:1.

The thermally treated copolymers of this invention are prepared by a series of reaction steps wherein the first step comprises thermally polymerizing a compound having the formula $(NPCl_2)_3$ by heating such to a temperature and for a length of time ranging from about 200° C. for 48 hours to 300° C. for 30 minutes, preferably in the absence of oxygen, and most preferably in the presence of a vacuum of at least $10^{-1}$ Torr. The product of such thermal polymerization is the mixture of polymers having the formula $+NPCl_2+_n$ wherein $n$ ranges from about 20 to about 2,000.

The second step, and esterification step, of this process comprises treating the mixture resulting from the thermal polymerization with a mixture of compounds having the formulas $$M(OC_6H_4-R_1)_x, \text{ and}$$

$$M(OC_6H_4-R_2)_x$$

wherein M is lithium, sodium, potassium, magnesium or calcium; $x$ is equal to the valence of the metal M; and $R_1$ and $R_2$ are as specified above. The polymer $+NPCl_2+_n$ is reacted with the mixture of metal compounds as disclosed above, at a temperature and a length of time ranging from about 25° C. for 7 days to about 200° C. for 3 hours. Normally, the above esterification step is carried out in the presence of a high boiling, substantially anhydrous solvent such as diglyme and the like.

Polymers produced as a result of the esterification step are a copolymer mixture having the formula $[NP(OC_6H_4R_1)_a(OC_6H_4R_2)_b]_n$, wherein $n$, $R_1$ and $R_2$ are as specified above and where $a$ and $b$ are integers and total at least 2 and the corresponding metal chloride salt.

The copolymeric reaction mixture resulting from the second, esterification, step is then treated to remove the salt which results from the reaction of chlorine in the polymer mixture with the metal of the alkali or alkaline earth metal compounds. This is most readily accomplished by precipitating the salt and filtering.

The copolymeric mixture formed from the esterification reaction can be purified by fractionally precipitating the copolymeric materials in order to separate out the high molecular weight polymer from the low molecular weight polymer and any unreacted trimer. The fractional precipitation of the esterified copolymeric mixture generally should be carried out at least twice, and preferably at least four times in order to remove as much of the low molecular weight polymer from the polymer mixture. In some cases, this fractional precipitation step may be eliminated, and the copolymeric mixture from the esterification step directly used in the final step for producing the thermally stabilized polyphosphazenes in accordance with the present invention.

The final step for producing the copolymers of enhanced processability, solubility, and thermal stability involves a thermal treatment of the esterified polymers of the previous step. This final step requires the polyphosphazenes of the esterification step to be heated to a temperature of greater than 100° C., but not more than 300° C., preferably from 133°-215° C. and preferably in the absence of air or oxygen. Such heating should be for at least 15 minutes and up to 168 hours; the higher temperature necessitating shorter thermal treatment times, the lower temperature, longer treatment times. It is preferred that the thermal treatment be carried out in an inert atmosphere, such as argon, neon, nitrogen or the like. It is most preferred to thermally treat these copolymeric materials in a vacuum of $10^{-2}$ Torr or less. The presence of oxygen is to be avoided since such causes oxidative cross linking in the thermally reacting materials. The thermal treatment, under the conditions disclosed above, results in molecular weight decreases that cause the very high molecular weight copolymers of the second, or esterification, step to decrease into the copolymers of the third and thermal treatment step of from $M_w$ $1 \times 10^6$ to $M_w$ of $1 \times 10^5$. Surprisingly, the polymers thermally treated in accordance with the present invention do not break down further into the low molecular weight oligomers or cyclic trimers. These polymers exhibit thermal stabilities at temperatures of from ambient up to 300° C., not suffering any substantial change in properties at these temperatures. However, temperatures in excess of 300° C. cause molecular weight increases, cross linking, and gel formation, which effectively diminish the polymer's use for any subsequent film-forming, processing or the like applications.

The novel copolymeric mixtures of this invention, as disclosed above, are thermally stable up to 300° C. The mixtures are soluble in specific organic solvents, such as tetrahydrofuran, benzene, xylene, toluene, dimethylformamide, dimethylsulfoxide, and the like, and can be easily cast into films from solutions by evaporation of the solvent. These copolymers are water resistant at room temperature and do not undergo hydrolysis at high temperatures. As such, the copolymers may be used to prepare films, fibers, coatings, molding compositions and the like. They may be blended with such additives as antioxidants, ultraviolet light absorbers, lubricants, plasticizers, dyes, pigments, fillers such as litharge, magnesia, calcium carbonate, furnace black, alumina trihydrate, hydrated silicas, and other resins, without detracting from the scope of the present invention.

The thermally treated copolymers may also be used to prepare foamed products which exhibit excellent fire retardancy and which produce low smoke levels, or essentially no smoke when heated in an open flame. The foamed products may be prepared from filled or unfilled formulations using conventional foam techniques with a variety of chemical blowing agents. Chemical blowing agents, as referred to herein, are chemical compounds stable at room temperatures, but which decompose or interact at elevated temperatures so as to provide a cellular foam. Suitable chemical blowing agents are well known in the art and include azobisisobutyronitrile, azodicarbonamide(1,1-azobisformamide), benzenesulfonyl hydrazide, ammonium carbonate, p,p'-oxybis-(benzenesulfonylhydrazide), diazo aminobenzene, diisobutylene, 4,4'-diphenyl disulfonylazide, and the like.

A typical foamable composition of the thermally treated phosphazene copolymers include:

|  | 100 parts | |
|---|---|---|
| Filler (e.g., alumina trihydrate) | 0-100 | phr |
| Stabilizer (e.g., magnesium oxide) | 2.5-10 | phr |
| Processing aid (e.g., zinc stearate) | 2.5-10 | phr |
| Plasticizer resin (e.g., Cumar P-10, coumarone indene resin) | 0-50 | phr |
| Blowing agent (e.g., 1,1'-azobisformamide) | 10-50 | hr |
| Activator (e.g., oil-treated urea) | 10-40 | phr |
| Peroxide curing agent (e.g., 2.5-dimethyl-2,5-di(t-butylperoxy) hexane) | 2.5-10 | phr |
| Peroxide curing agent (e.g., benzoyl peroxide) | 2.5-10 | phr |

While the above are preferred formulation guidelines, obviously some or all of the adjuvants may be omitted, replaced by other functionally equivalent materials, or the proportions varied, within the skill of the art of the foam formulator.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example 100°-120° F. The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,5-dimethyl-2,5-di(t-butylperoxy) hexane, and partially pre-curing in a closed mold for about 6-30 minutes at 200°-250° F., followed by free expansion for 30-60 minutes at 300°-350° F. In the alternative, the foaming may be accomplished by heating the foamable mass for 30-60 minutes at 300°-350° F. using a high temperature or low temperature curing agent, either singly or in combination. One benefit of utilizing the "partial pre-cure" foaming technique is that an increase in the molecular weight of the foamable polymer prior to the foaming step enables better control of pore size and pore uniformity in the foaming step. The extent of "pre-cure" desired is dependent upon the ultimate foam characteristics desired. The desired foaming temperature is dependent on the nature of the blowing agent and the cross linkers present. The time of heating is dependent on the size and shape of the mass being foamed. The resultant foams are generally light tan to yellowish in appearance, and vary from flexible to semirigid, depending upon the glass transition temperature of the copolymer employed in the foam formulation, that is to say, the lower the glass transition of the copolymer the more flexible will be the foam produced therefrom. As indicated, inert, reinforcing or other fillers such as alumina trihydrate, hydrated silicas or calcium carbonate can be added to the copolymer foams and the presence of these and other conventional additives should in no way be construed as falling outside the scope of this invention.

Also, as mentioned above, the thermally treated copolymers of this invention can be cross linked at moderate temperatures by conventional free radical curing techniques. The ability of these copolymers to be cured at temperatures below about 350° F. makes them particularly useful as potting and encapsulation compounds, sealants, coatings and the like. These copolymers are also useful for preparing cross-linked foams which exhibit significantly increased tensile strengths over uncured foams. These copolymers are often cross linked in the presence of inert, reinforcing or other fillers and the presence of these and other conventional additives are deemed to be within the scope of this invention.

The thermally-treated polymers in accordance with the present invention provide films that are generally flexible in character, do not burn and are water repellent. Their Oxygen Index and flammability properties are substantially identical to the high molecular weight polyphosphazene precursor. Such properties are set forth in detail in the heretofore disclosed U.S. patent application Ser. No. 661,862, filed Feb. 27, 1976.

The following examples are set forth for purposes of illustration only and are not to be construed as limitations of the present invention except as set forth in the appended claims. All parts and percentages are by weight unless otherwise indicated. All Tg's are by differential scanning colorimetry. Molecular weights are Mw as determined on Waters GPC, Model 200.

EXAMPLE 1

Preparation of $+NPCl_2+_n$ 250 parts of hexachlorocyclotriphosphazene, previously recrystallized from n-heptane, were degassed and sealed in a suitable, thick-walled reaction vessel at $10^{-2}$ Torr and heated to 250° C. for six hours. Polymerization was terminated at this time since a glass ball, one-half inch in diameter ceased to flow due to the increased viscosity of the molten mass, when the vessel was inverted. Termination was effected by cooling the vessel to room temperature. The resulting polymeric mixture was then dissolved in toluene to form an anhydrous solution. Tg = −63° C.

EXAMPLE 2

Preparation of $[NP(OC_6H_4—p—isoC_3H_7)_2]_n$

The anhydrous toluene solution of poly(dichlorophosphazene) formed in Example 1, containing 4.20 equivalents of poly(dichlorophosphazene), was added to an anhydrous diglyme-benzene solution of 5.02 equivalents of $NaOC_6H_4—p—isoC_3H_7$ at a temperature of 95° C. with constant stirring. After the addition, benzene was distilled from the reaction mixture until a temperature of 115°–116° C. was attained. The reaction was then heated at reflux for 60–65 hours. At the end of this time the copolymer was precipitated by pouring the reaction mixture into an excess of methyl alcohol. The polymer was stirred in methyl alcohol for 24 hours. Next, it was added to a large excess of water and stirred for an additional 24 hours. Tg = +0.10° C.

EXAMPLE 3

Preparation of $[NP(OC_6H_5)(OC_6H_4—p—isoC_3H_7)]_n$

The procedure of Example 2 was followed, except that 0.56 equivalents of poly(dichlorophosphazene) was added to 0.31 equivalents of $NaOC_6H_5$ and 0.31 equivalents of $NaOC_6H_4—p—isoC_3H_7$. Tg = −4.9° C.

EXAMPLE 4

Preparation of
$[NP(OC_6H_4—p—CH_3)(OC_6H_4—p—secC_4H_9)]_n$

The procedure of Example 2 was followed, except that 0.60 equivalents of poly(dichlorophosphazene) was added to 0.36 equivalents of $NaOC_6H_4—p—CH_3$ and 0.36 equivalents of $NaOC_6H_4—p—secC_4H_9$. Tg = +0.30° C.

EXAMPLE 5

Preparation of
$[NP(OC_6H_4—p—OCH_3)(OC_6H_4—p—isoC_3H_7)]_n$

The procedure of Example 2 was followed, except that 4.00 equivalents of poly(dichlorophosphazene) was added to 4.80 equivalents of $NaOC_6H_4—p—OCH_3$ and 4.80 equivalents of $NaOC_6H_4—p—isoC_3H_7$. Tg = +4.1° C.

EXAMPLE 6

Preparation of
$[NP(OC_6H_4—p—OCH_3)(OC_6H_4—p—O—nC_4H_9)]_n$

The procedure of Example 2 was followed, except that 1.0 equivalents of poly(dichlorophosphazene) was added to 0.60 equivalents of $NaOC_6H_4—p—OCH_3$ and 0.60 equivalents of $NaOC_6H_4—p—O—nC_4H_9$. Tg = −5.0° C.

EXAMPLE 7

Thermally Treated $[NP(OC_6H_4—p—isoC_3H_7)_2]_n$; 200° C.

10 parts of the polymer $[NP(OC_6H_4—p—isoC_3H_7)_2]_n$ prepared in Example 2 were degassed and sealed in a suitable, thick-walled reaction vessel at $10^{-2}$ Torr and heated at 200° C. for 30 minutes. The resulting polymer formed a 1% solution in tetrahydrofuran in a period of 45 minutes. The untreated polymer (Example 2) required over 8 hours to form such 1% solution. Gel Permeation Chromatography indicated that the untreated polymer had an Mw = 978,000 while the thermally treated material had an Mw = 477,000. It was also determined that none of the thermally treated polymer was cross-linked gel. Tg = 0.10° C. Oxygen Index 23.4.

The procedure of Example 7 was followed except that the polymers listed in the table were employed with the resulting polymers having the properties shown.

EXAMPLES 8–11

| Example | Polymer | Time[a] | Original Mw | Final Mw | Tg | Oxygen Index |
|---|---|---|---|---|---|---|
| 8 | $[NP(OC_6H_5)(OC_6H_4-p-isoC_3H_7)]_n$ | 30 minutes | 1,200,000 | 577,000 | −4.9° C. | 25.8 |
| 9 | $[NP(OC_6H_4-Y-CH_3)(OC_6H_4-p-secC_4H_9)]_n$ | 30 minutes | 605,000 | 305,000 | +0.30° C. | — |
| 10 | $[NP(OC_6H_4-p-OCH_3)(OC_6H_4-p-isoC_3H_7)]_n$ | 30 minutes | 1,360,000 | 544,000 | +4.1° C. | 26.0 |
| 11 | $[NP(OC_6H_4-p-OCH_3)(OC_6H_4-p-O-nC_4H_9)]_n$[b] | 30 minutes | 1,360,000 | 371,000 | −5.0° C. | — |

[a]Temperature of theremal treatment was 200° C. at $10^{-2}$Torr.
[b]This polymer formed a 1% solution in tetrahydrofuran within 60 minutes. The untreated polymer (Example 5) required over 8 hours to form such 1% solution.

EXAMPLE 12

Thermally Treated $[NP(OC_6H_4—p—isoC_3H_7)_2]_n$; 100° C.

The procedure of Example 7 was followed, except that the thermal treatment was at 100° C. for 1680 hours. The resulting polymer was more soluble in tetrahydrofuran than the initial polymer prepared in Example 2. Gel Permeation Chromatography indicated that the untreated polymer had an Mw = 978,000 while the thermally treated material had an Mw = 780,000. It was also determined that none of the thermally treated polymer was cross-linked gel. Tg = 0.10° C.

EXAMPLE 13

Thermally Treated $[NP(OC_6H_4—p—isoC_3H_7)_2]_n$; 133° C.

The procedure of Example 7 was followed, except that the thermal treatment was at 133° C. for 168 hours. The resulting polymer was more soluble in tetrahydrofuran than the initial polymer prepared in Example 2. Gel Permeation Chromatography indicated that the untreated polymer had an Mw = 978,000 while the thermally treated material had an Mw = 547,000. It was also determined that none of the thermally treated polymer was cross-linked gel. Tg = 0.10° C.

EXAMPLE 14

Thermally Treated $[NP(OC_6H_4—p—isoC_3H_7)_2]_n$; 215° C.

The procedure of Example 7 was followed, except that the thermal treatment was at 215° C. for 30 minutes. The resulting polymer was more soluble in tetrahydrofuran than the initial polymer prepared in Example 2. Gel Permeation Chromatography indicated that the untreated polymer had an Mw = 978,000 while the thermally treated material had an Mw = 477,000. It was also determined that none of the thermally treated polymer was cross-linked gel. Tg = 0.10° C.

EXAMPLE 15

Thermally Treated $[NP(OC_6H_4-p-isoC_3H_7)_2]_n$; 300° C.

The procedure of Example 7 was followed, except that the thermal treatment was at 300° C. for 15 minutes. The resulting polymer was more soluble in tetrahydrofuran than the initial polymer prepared in Example 2. Gel Permeation Chromatography indicated that the untreated polymer had an Mw = 978,000 while the thermally treated material had an Mw = 330,000. It was also determined that none of the thermally treated polymer was cross-linked gel. Tg = 0.10° C.

EXAMPLE 16

Preparation of Foamed $[NP(OC_6H_4-p-OCH_3)(OC_6H_4-p-isoC_3H_7)]_n$

To 100 parts of the thermally treated polymer prepared in accordance with Example 5, there were added 90 parts of alumina trihydrate, 5 parts of magnesium oxide, 10 parts of zinc stearate, 2 parts of a p-coumarone-indene resin designated CUMAR P-10, Allied Chemical Company, 20 parts of 1,1' azobisformamide, 5 parts of BIK-OT (a Uniroyal oil-treated urea) as an activator, 6 parts of 2,5-dimethyl-2,5-di(t-butyl peroxy)-hexane, 2 parts of benzoyl peroxide (78% active), and 1 part of dicumyl peroxide. The above ingredients were milled to insure homogeneous mixing of all materials and were then precured in an open-sided mold for 2 minutes at 220° F. under 2000 psi. The precured copolymer was then free expanded in a circulating air oven for 20 minutes at 300° F. The resultant foam was light tan in color and was flexible.

What is claimed is:

1. The process of foaming an aryloxy polyphosphazene polymer prepared by the process comprising thermally treating poly(aryloxyphosphazene) polymers in which the phosphorus atom of the backbone contains substituted aryloxy substituents on the phosphorus atom having randomly distributed repeating units represented by the formulas:

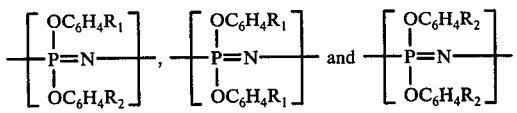

wherein $R_1$ and $R_2$ are the same or different and are hydrogen, $C_1-C_{10}$ linear or branched alkyl or $C_1-C_4$ linear or branched alkoxy, wherein when $R_1$ and $R_2$ are different, $(OC_6H_4-R_1):(OC_6H_4-R_2)$ is from about 1:6 to about 6:1, said thermal treatment carried out at 100°–300° C. in an inert atmosphere, the weight average molecular weight of said thermally treated polymers from $1 \times 10^6$ to $1 \times 10^5$, which comprises mixing the said copolymers with a chemical blowing agent and a mixture of curing agents, at least one of said curing agents having an initiation temperature below the temperature at which the chemical blowing agent decomposes; heating the mixture to a temperature below the decomposition temperature of said blowing agent, but above the initiation temperature of at least one of said curing agents for a time sufficient to partially pre-cure the copolymer; and heating the partially pre-cured mixture to a temperature from above the decomposition temperature of said blowing agent to foam the copolymer and effect a further cure thereof.

2. The process in accordance with claim 1 wherein said partial pre-cure is accomplished by heating the foamable mixture for about 6 to about 30 minutes at a temperature of from about 200° to about 250° F. and the foaming and further curing is accomplished by heating the partially pre-cured mixture for about 30 to about 60 minutes at a temperature of from about 300° to about 350° F.

3. The process of foaming aryloxyphosphazene polymers prepared by thermally treating a polymer having randomly distributed repeating units of the formula

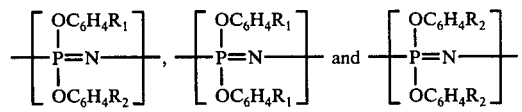

wherein $R_1$ and $R_2$ are the same or different and are hydrogen, $C_1-C_{10}$ linear or branched alkyl or $C_1-C_4$ linear or branched alkoxy, said thermal treatment carried out at 100°–300° C. in an inert atmosphere, the weight average molecular weight of said thermally treated polymers from $1 \times 10^6$ to $1 \times 10^5$, which comprises mixing the said polymers with a chemical blowing agent and heating the mixture to a temperature sufficient to decompose said blowing agent.

4. The process of claim 3 wherein said blowing agent is 1,1'-bisazoformamide.

5. A foamed aryloxyphosphazene polymer prepared by thermally treating a polymer having randomly distributed repeating units of the formula

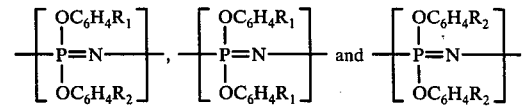

wherein $R_1$ and $R_2$ are the same or different and are hydrogen, $C_1-C_{10}$ linear or banched alkyl or $C_1-C_4$ linear or branched alkoxy, said thermal treatment carried out at 100°–300° C. in an inert atmosphere, the weight average molecular weight of said thermally treated polymers from $1 \times 10^6$ to $1 \times 10^5$.

6. The foamed aryloxyphosphazene polymer of claim 5 wherein when said $R_1$ and $R_2$ are different, $(OC_6H_4R_1):(OC_6H_4R_2)$ is from about 1:6 to 6:1.

7. The foamed polymer in accordance with claim 5 wherein said thermal treatment is carried out for at least 15 minutes.

* * * * *